US009991799B2

(12) United States Patent
Liu et al.

(10) Patent No.: US 9,991,799 B2
(45) Date of Patent: Jun. 5, 2018

(54) SWITCH MODE POWER SUPPLIES INCLUDING PRIMARY SIDE CLAMPING CIRCUITS CONTROLLED BASED ON SECONDARY SIDE SIGNALS

(71) Applicant: Astec International Limited, Kowloon (HK)

(72) Inventors: Jun Liu, Shenzhen (CN); Chunyu Ding, Shenzhen (CN); Qingfeng Liu, Shenzhen (CN); Zhendong Zhang, Shenzhen (CN)

(73) Assignee: Astec International Limited, Kwun Tong, Kowloon (HK)

( * ) Notice: Subject to any disclaimer, the term of this patent is extended or adjusted under 35 U.S.C. 154(b) by 0 days. days.

(21) Appl. No.: 15/035,712

(22) PCT Filed: Mar. 1, 2016

(86) PCT No.: PCT/CN2016/075225
§ 371 (c)(1),
(2) Date: May 10, 2016

(87) PCT Pub. No.: WO2017/147790
PCT Pub. Date: Sep. 8, 2017

(65) Prior Publication Data
US 2017/0257033 A1    Sep. 7, 2017

(51) Int. Cl.
*H02M 3/335*     (2006.01)
*H02M 1/08*      (2006.01)
*H02M 1/00*      (2006.01)

(52) U.S. Cl.
CPC ......... *H02M 3/33507* (2013.01); *H02M 1/08* (2013.01); *H02M 3/33569* (2013.01);
(Continued)

(58) Field of Classification Search
CPC ............... H02M 3/33507; H02M 1/08; H02M 2001/0009; H02M 2001/0048
See application file for complete search history.

(56) References Cited

U.S. PATENT DOCUMENTS 6,111,769 A * 8/2000 Zhang ..................... H02M 1/34
                                                        363/127
6,188,592 B1 * 2/2001 Farrington ........ H02M 3/33592
                                                        363/127
(Continued)

FOREIGN PATENT DOCUMENTS

CN     101860236 A    10/2010
CN     203057005 U     7/2013
(Continued)

OTHER PUBLICATIONS

Benefits of Adding an Active Clamp to a Synchronous Flyback Power Supply, John Betten and and Brian King, Texas Instruments Incorporated (7 pages).

*Primary Examiner* — Adolf Berhane
*Assistant Examiner* — Bart Iliya
(74) *Attorney, Agent, or Firm* — Harness, Dickey & Pierce, P.L.C.

(57) ABSTRACT

A switch mode power supply includes an input, an output, and a power converter coupled between the input and the output. The power converter includes a transformer having a primary side and a secondary side, and a clamping circuit. The clamping circuit has a switching device coupled to the primary side of the transformer. The power supply further includes a control circuit coupled to the switching device. The control circuit includes at least one isolation component. The control circuit is configured to receive a signal from the secondary side of the transformer via the at least one isolation component, and control the switching device coupled to the primary side of the transformer in response to
(Continued)

the signal received from the secondary side of the transformer via the at least one isolation component. Other example power supplies, power converters, control circuits, etc. are also disclosed.

18 Claims, 6 Drawing Sheets

(52) U.S. Cl.
CPC .............. *H02M 2001/0009* (2013.01); *H02M 2001/0048* (2013.01)

(56) References Cited

U.S. PATENT DOCUMENTS

| | | | |
|---|---|---|---|
| 6,552,917 B1* | 4/2003 | Bourdillon | H02M 3/33561 363/21.12 |
| 2004/0136207 A1* | 7/2004 | Havanur | H02M 3/33592 363/21.06 |
| 2010/0177536 A1* | 7/2010 | Liu | H02M 3/33592 363/17 |
| 2010/0188872 A1* | 7/2010 | Matsumoto | H02M 1/34 363/21.06 |
| 2011/0122660 A1 | 5/2011 | Cacciotto | |
| 2012/0257421 A1* | 10/2012 | Brkovic | H01F 27/38 363/21.07 |
| 2015/0138845 A1* | 5/2015 | Shinozaki | H02M 1/36 363/21.1 |

FOREIGN PATENT DOCUMENTS

| | | |
|---|---|---|
| CN | 204131396 U | 1/2015 |
| CN | 104467440 A | 3/2015 |
| CN | 104852579 A | 8/2015 |

\* cited by examiner

SWITCH MODE POWER SUPPLIES INCLUDING PRIMARY SIDE CLAMPING CIRCUITS CONTROLLED BASED ON SECONDARY SIDE SIGNALS

FIELD

The present disclosure relates to switch mode power supplies including primary side clamping circuits controlled based on secondary side signals.

BACKGROUND

This section provides background information related to the present disclosure which is not necessarily prior art.

Various switch mode power supplies including non-isolated power circuitry and isolated power circuitry are known. An isolated power circuit may include a transformer and various switching devices on a primary side and/or a secondary side of the transformer. In some cases, an isolated power circuit includes a clamp positioned on its primary side. The clamp may itself include a switching device controlled based on a signal generated from the primary side of the transformer.

SUMMARY

This section provides a general summary of the disclosure, and is not a comprehensive disclosure of its full scope or all of its features.

According to one aspect of the present disclosure, a switch mode power supply includes an input to receive an input voltage, an output to provide an output voltage, and a power converter coupled between the input and the output. The power converter includes a transformer having a primary side and a secondary side, and a clamping circuit. The primary side of the transformer is coupled to the input and the secondary side of the transformer is coupled to the output. The clamping circuit has at least one switching device coupled to the primary side of the transformer. The power supply further includes a control circuit coupled to the at least one switching device. The control circuit includes at least one isolation component. The control circuit is configured to receive a signal from the secondary side of the transformer via the at least one isolation component, and control the at least one switching device coupled to the primary side of the transformer in response to the signal received from the secondary side of the transformer via the at least one isolation component.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
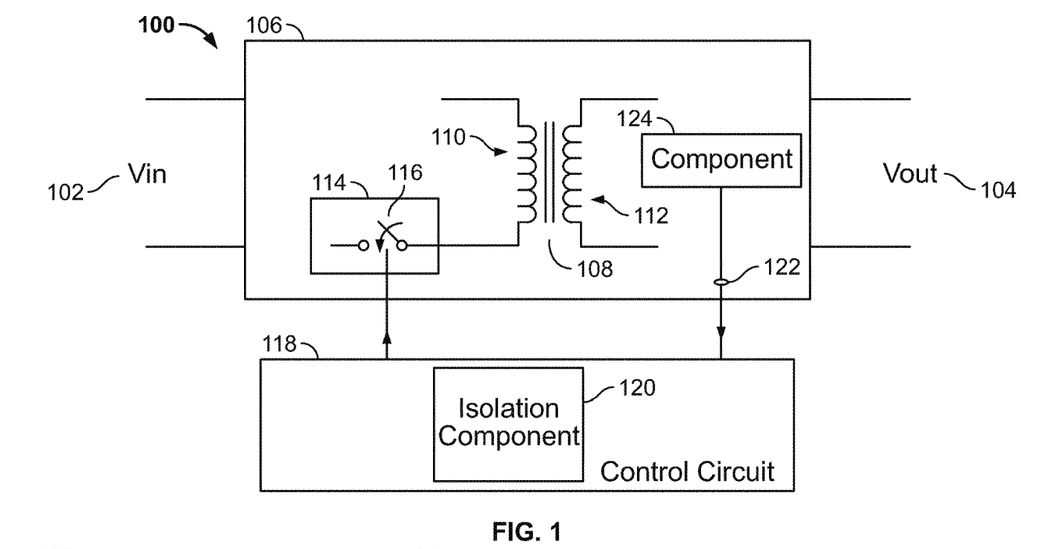
FIG. 1 is a block diagram of a power supply including a control circuit and a power converter having a clamp switching device on a primary side of a transformer that is controlled based on a signal generated on a secondary side of the transformer according to one example embodiment of the present disclosure.

A switch mode power supply according to one example embodiment of the present disclosure is illustrated in FIG. 1 and indicated generally by reference number 100. As shown in FIG. 1, the switch mode power supply 100 includes an input 102 to receive an input voltage Vin, an output 104 to provide an output voltage Vout, and a power converter 106 coupled between the input 102 and the output 104. The power converter 106 includes a transformer 108 having a primary side 110 and a secondary side 112, and a clamping circuit 114. The primary side 110 of the transformer 108 is coupled to the input 102 and the secondary side 112 of the transformer 108 is coupled to the output. The clamping circuit 114 includes at least one switching device 116 coupled to the primary side 110 of the transformer 108. The switch mode power supply 100 further includes a control circuit 118 coupled to the at least one switching device 116 and having at least one isolation component 120. The control circuit 118 is configured to receive a signal 122 from the secondary side 112 of the transformer 108 via the at least one isolation component 120, and control the at least one switching device 116 coupled to the primary side 110 of the transformer 108 in response to the signal 122 received from the secondary side 112 of the transformer 108 via the at least one isolation component 120.

Preferably, the clamping circuit 114 includes an active clamping circuit including one or more active components such as the switching device 116. In some embodiments, the clamping circuit 114 may include additional active components and/or passive components. In other embodiments, the clamping circuit 114 may only include one active component (i.e., the switching device 116).

The clamping circuit 114 clamps a voltage across a primary winding of the transformer 108 during turn-off of a primary side power switching device (not shown in FIG. 1) that may otherwise rise due to energy stored in the transformer 108 as further explained below. Because the primary side power switching device is coupled to the primary winding of the transformer 108, the clamping circuit 114 prevents undesirable voltage spikes across this switching device.

The power converter 106 of FIG. 1 may include a flyback converter, as further explained below. In other examples, the power converter 106 may include a forward converter and/or another suitable power converter having isolation power circuitry.

The isolation component 120 of FIG. 1 includes one or more components to isolate a primary side of the control circuit 118 from a secondary side of the control circuit 118. The isolation component 120 may be used to pass one or more signals from the secondary side 112 to the primary side 110 of the transformer 108 to control at least the switching device 116 as explained herein.

Figure 2A:
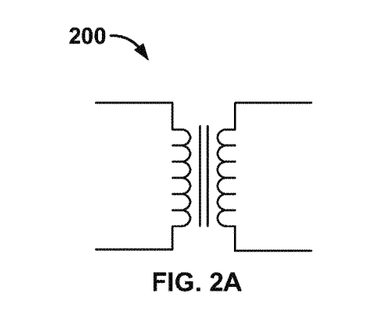
FIG. 2A is a circuit diagram of a transformer employable as an isolation component in the control circuit of FIG. 1, according to another example embodiment.
Figure 2B:
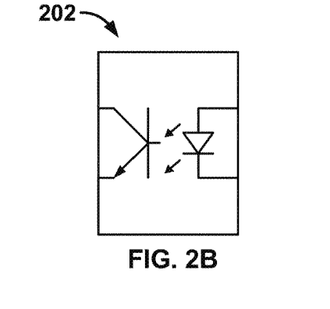
FIG. 2B is a circuit diagram of an optocoupler employable as an isolation component in the control circuit of FIG. 1, according to yet another example embodiment.
Figure 2C:
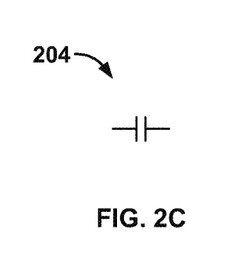
FIG. 2C is a circuit diagram of a capacitor employable as an isolation component in the control circuit of FIG. 1, according to another example embodiment.

The isolation component 120 may include, for example, a transformer, an optocoupler, a capacitor and/or another suitable isolation component. For example, FIGS. 2A, 2B, and 2C illustrate a transformer 200, an optocoupler 202, and a capacitor 204, respectively, that may be employed as or at least a part of the isolation component 120.

Referring back to FIG. 1, the signal 122 may be provided by a component 124 positioned on the secondary side 112 of the transformer 108. The component 124 may or may not be coupled to the transformer 108 (e.g., a secondary winding of the transformer 108). For example, and as further explained below, the component 124 may be a driver for another switching device on the secondary side 112 of the transformer 108. In other embodiments, the component 124 may be a sensor coupled to the transformer 108.

Figure 3:
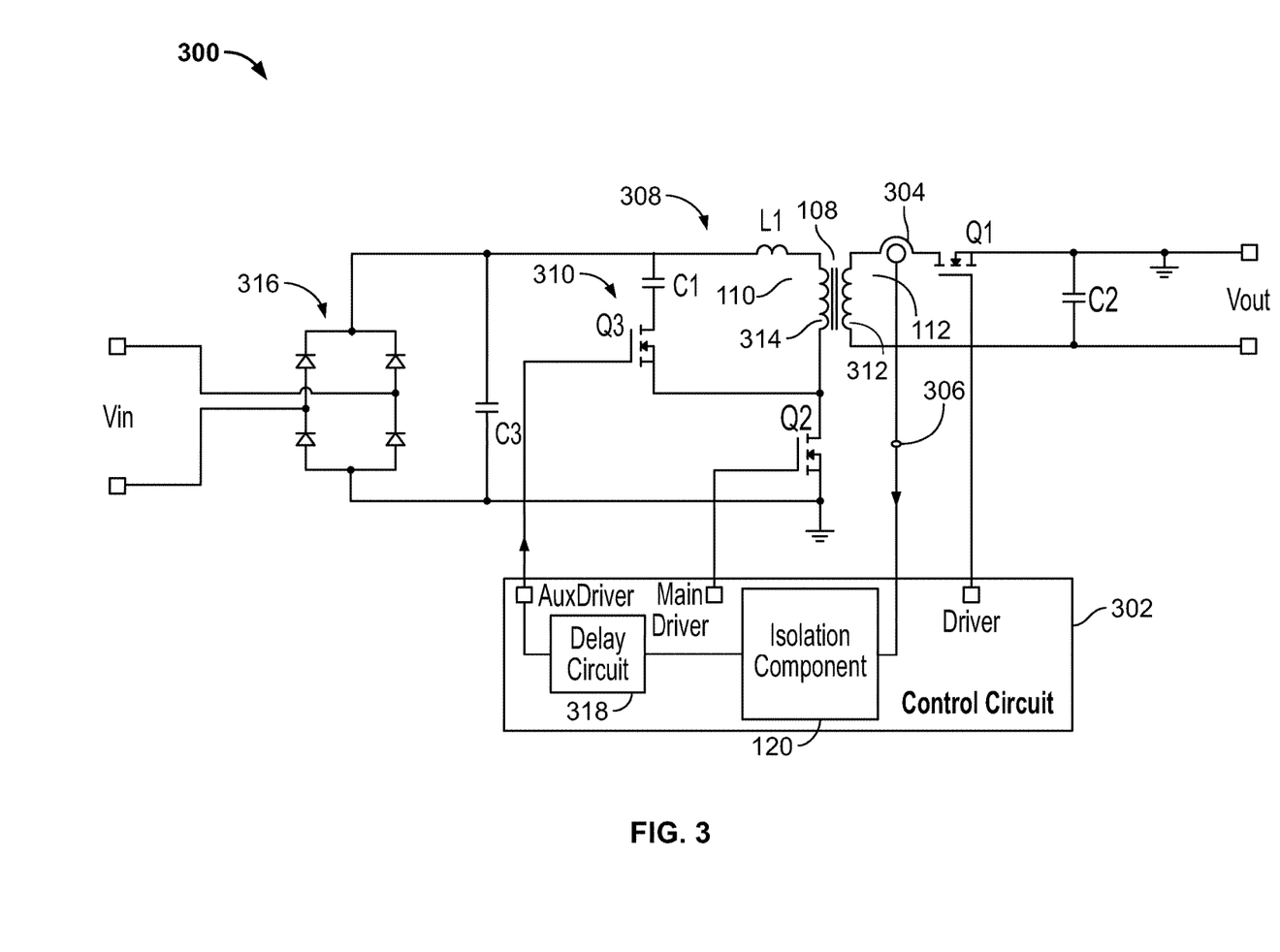
FIG. 3 is a circuit diagram of a power supply including a flyback power converter having a clamp switching device on a primary side of a transformer that is controlled based on a sensed current positioned on a secondary side of the transformer according to yet another example embodiment.

For example, FIG. 3 illustrates a power supply 300 including the transformer 108 of FIG. 1, a control circuit 302 substantially similar to the control circuit 118 of FIG. 1, and a current sensor 304 coupled to the secondary side 112 of the transformer 108. As shown in FIG. 3, the control circuit 302 receives a signal 306 from the current sensor 304 and controls a switching device Q3 coupled to the primary side 110 of the transformer 108 via the isolation component 120.

In the particular example of FIG. 3, the power supply 300 includes a flyback power converter 308 having the transformer 108, a flyback switching device Q2, an active clamping circuit 310 coupled to the transformer 108, and a switching device Q1 coupled to a secondary winding 312 of the transformer 108. The active clamping circuit 310 of FIG. 3 includes the switching device Q3 and a capacitor C1, and functions similar to the clamping circuit 114 of FIG. 1. For example, the clamping circuit 310 clamps a voltage across a primary winding 314 of the transformer 108 during turn-off of the switching device Q2 that may otherwise rise due to energy stored in the transformer 108. This energy stored in the transformer is shown (at least partially) as inductor L1 and includes leakage inductance of the transformer 108, magnetizing inductance of the transformer 108, etc.

The control circuit 302 of FIG. 3 may include various components for controlling the switching devices Q1, Q2, Q3. In the particular example of FIG. 3, the control circuit 302 includes a driver (sometimes referred to as the switch driver) to control the switching device Q1 on the secondary side 112 of the transformer 108, a main driver to control the switching device Q2, and an auxiliary driver to control the switching device Q3 of the clamping circuit 310. The switch driver and the main driver may control the switching device Q1 and the switching device Q2, respectively, to turn on/off in a complementary manner, as is typical for a flyback power converter.

One or more of the drivers may use the signal 306 from the current sensor 304 on the secondary side 112 of the transformer 108 to control a switching device. For example, the control circuit 302 receives the signal 306, which is a voltage representative of the current flowing through the switching device Q1. The control circuit 302 can then control the switching device Q3 (with the auxiliary driver) in response to this signal received from the secondary side 112 of the transformer 108 via the isolation component 120.

During operation, the signal 306 (e.g., a voltage) is in a low state when the switching device Q1 is on. This low signal is used to force the gate of the switching device Q3 high thereby turning the switching device Q3 on. Conversely, when the switching device Q1 is off, substantially zero current is sensed by current sensor 304 causing the signal 306 to increase to a high state. This high state may occur when the value of the signal 306 exceeds a defined threshold value. The high signal is then used to turn the switching device Q3 off. Thus, the switching devices Q1, Q3 are turned on and/or off at substantially the same time. In other words, the control circuit 302 controls the switching devices Q1, Q3 such that the switching device Q1 and the switching device Q3 transition between an ON state and an OFF state in a corresponding manner.

In some examples, a delay may be employed between when one of the switching devices Q1, Q3 transitions and the other the switching device Q1, Q3 transitions. For example, and as shown in FIG. 3, the control circuit 302 includes a delay circuit 318 to delay a transition of the switching device Q3 relative to a transition of the switching device Q1. As such, the switching device Q3 may turn on and/or turn off after the switching device Q1. This may ensure the switching device Q3 (that transitions with the switching device Q1 as further explained above) and the power switching device Q2 (that transitioning complementary to the switching device Q1) are not turned on at the same time causing a short through on the primary side 110 of the transformer 108.

In the particular example of FIG. 3, the delay circuit 318 is coupled on the primary side of the isolation component 120. In other embodiments, the delay circuit 318 and/or another suitable delay circuit may be coupled to the secondary side of the isolation component 120 if desired.

Although not shown, the delay circuit 318 may include various components to create the delay. For example, the delay circuit 318 may include one or more operational amplifiers, resistors, capacitors and/or other suitable components to create the delay.

Figure 4:
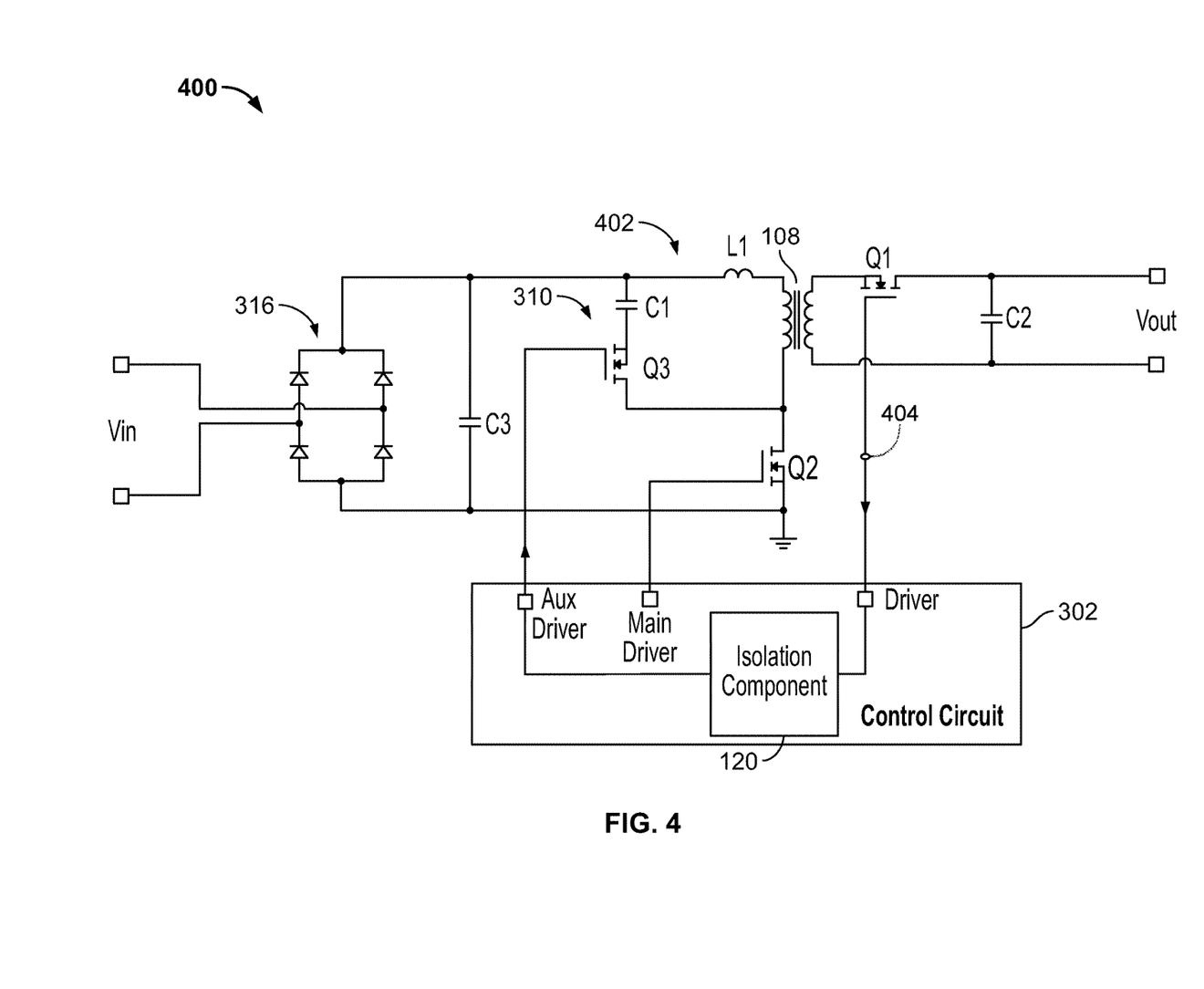
FIG. 4 is a circuit diagram of a power supply including a flyback power converter having a clamp switching device on a primary side of a transformer that is controlled based on a switch driver positioned on a secondary side of the transformer according to another example embodiment.

FIG. 4 illustrates a power supply 400 substantially similar to the power supply 300 of FIG. 3. For example, the power supply 400 includes a flyback power converter 402 having the transformer 108, the switching devices Q1, Q2, the active clamping circuit 310 including the switching device Q3, and the control circuit 302 of FIG. 3. A signal 404 controlling the switching device Q3, however, is generated by the switch driver that controls the switching device Q1.

For example, the control circuit 302 receives the signal 404 from the switch driver, and controls the switching device Q3 in response to the signal 404 received from the secondary side of the transformer 108 via the isolation component 120, as explained above. Thus, similar to the embodiment of FIG. 3, the switching devices Q1, Q3 of FIG. 4 can be turned on/off at substantially the same time as both are controlled based on the same signal 404.

Additionally, in the particular example of FIG. 4, the control circuit 302 does not include a delay circuit to delay a transition of the switching device Q3 relative to a transition of the switching device Q1 as explained above. In other examples, a delay circuit (e.g., the delay circuit 318, etc.) may be employed to create a delay between switching transitions of the switching devices Q1, Q3 if desired.

Figure 5:
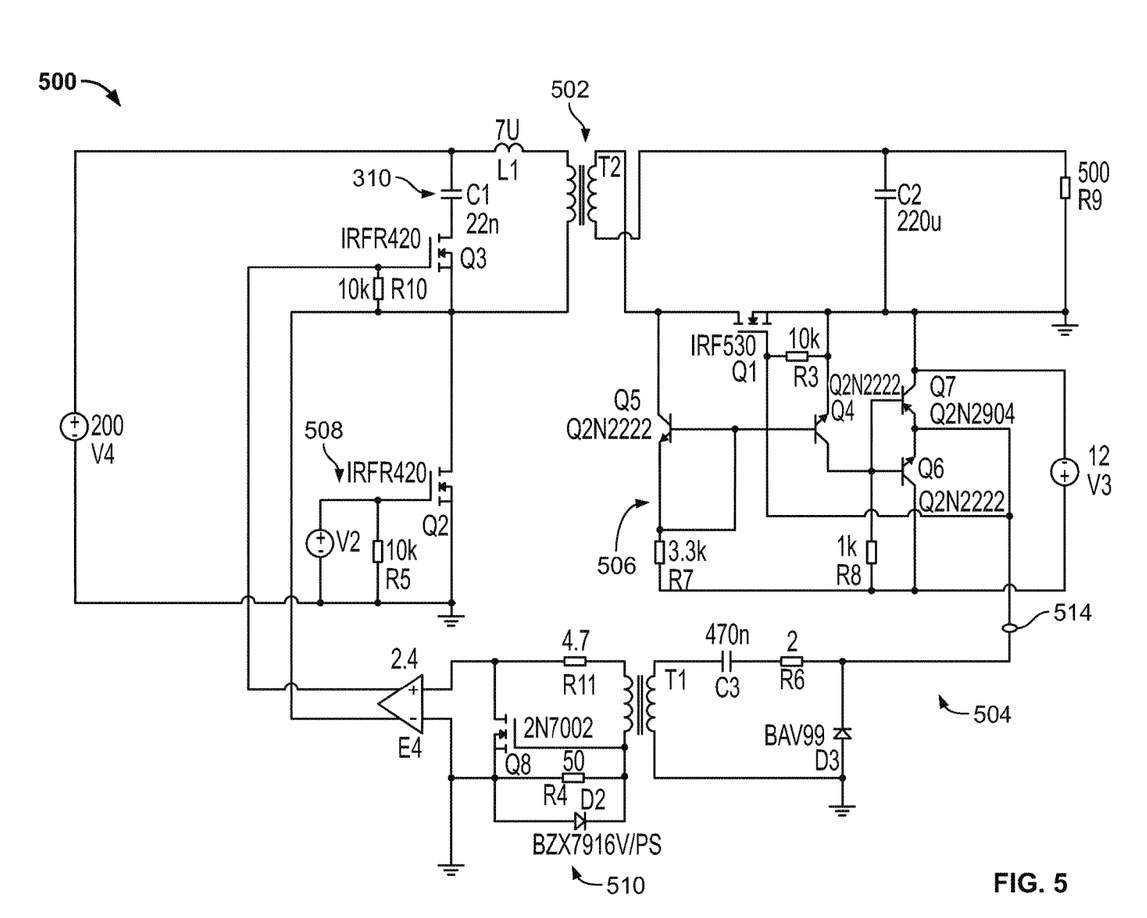
FIG. 5 is a circuit diagram of a power supply including a control circuit having an transformer and a flyback power converter having a primary side clamp switching device that is controlled based on a secondary side switch driver according to yet another example embodiment.

FIG. 5 illustrates a power supply 500 substantially similar to the power supply 400 of FIG. 4. For example, the power supply 500 includes a flyback power converter 502 having a transformer T2 substantially similar to the transformer 108 of FIG. 4, the switching devices Q1, Q2, the active clamping circuit 310 including the switching device Q3, and a control circuit 504. In the particular example of FIG. 5, the switching devices Q1, Q2, Q3 each include a MOSFET having a source terminal, a drain terminal, and gate terminal.

As shown in FIG. 5, the control circuit 504 includes a transformer T1 (e.g., an isolation component) that isolates a primary side of the control circuit 504 from a secondary side of the of the control circuit 504. Similar to FIGS. 3 and 4, the control circuit 504 further includes a main driver 508 to control the switching device Q2, a switch driver 506 to control the switching device Q1 on the secondary side of the transformer T2, and an auxiliary driver 510 to control the switching device Q3 of the clamping circuit 310.

The auxiliary driver 510 includes resistors R4, R6, R10, R11, a capacitor C3, a switching device Q8 (shown as a MOSFET), diodes D2, D3, and a comparator E4. The source terminal and drain terminal of the MOSFET Q8 are coupled to opposing terminals of the comparator E4 and the gate terminal of the MOSFET Q8 is coupled to the transformer T1.

As shown in FIG. 5, the switch driver 506 includes switching devices Q4, Q5, Q6, Q7 (shown as transistors in FIG. 5) and resistors R3, R7, R8, and a basis voltage V3. The transistor Q4 is coupled to a source terminal of the MOSFET Q1 and the transistor Q5 is coupled to a drain terminal of the MOSFET Q1. The transistors Q6, Q7 form a totem pole circuit which is coupled to a gate terminal of the MOSFET Q1.

In particular example of FIG. 5, an emitter terminal of the transistor Q4 is coupled to the source terminal of the MOSFET Q1. A collector terminal of the transistor Q5 is coupled to the drain terminal of the MOSFET Q1 and an emitter terminal of the transistor Q5 is coupled to a base terminal of the transistor Q5. The totem pole circuit is coupled to a collector terminal of the transistor Q4. The collector terminals of the transistors Q4, Q5 are coupled together.

Alternatively, the switch driver 506 of FIG. 5 may include a different configuration. In some embodiments, the transistors Q6, Q7 which form the totem pole circuit may form another push-pull transistor configuration if desired. In other embodiments, the switch driver may include more or less switching devices, switching devices arranged differently, etc. For example, the switch driver 506 may include driver circuitry similar to a commercially available driver from ON Semiconductor (e.g., product number NCP4305), NXP Semiconductors N.V. (e.g., product number TEA1993), etc. Other examples of suitable switch drivers include those disclosed in U.S. Pat. No. 8,207,779, the entire disclosure of which is incorporated herein by reference.

The main driver 508 includes a basis voltage V2 and a resistor R5. The components of the drivers 506, 508 may be designed such that the switching devices Q1, Q2 turn on and off in a complementary manner, as explained above. For example, the basis voltages V2, V3 may be variable, controlled based on each other, etc. to ensure the switching devices Q1, Q2 turn on and off in a complementary manner.

Similar to the control circuit 302 of FIG. 4, the control circuit 504 of FIG. 5 utilizes a signal 514 from the switch driver 506 to control the MOSFET Q1 and the MOSFET Q3. For example, the switch driver 506 generates (e.g., via its totem pole circuit) the signal 514 to control the MOSFET Q1. This same signal 514 is passed through the transformer T1, and is used to control the MOSFET Q3 as explained herein.

Figure 6:
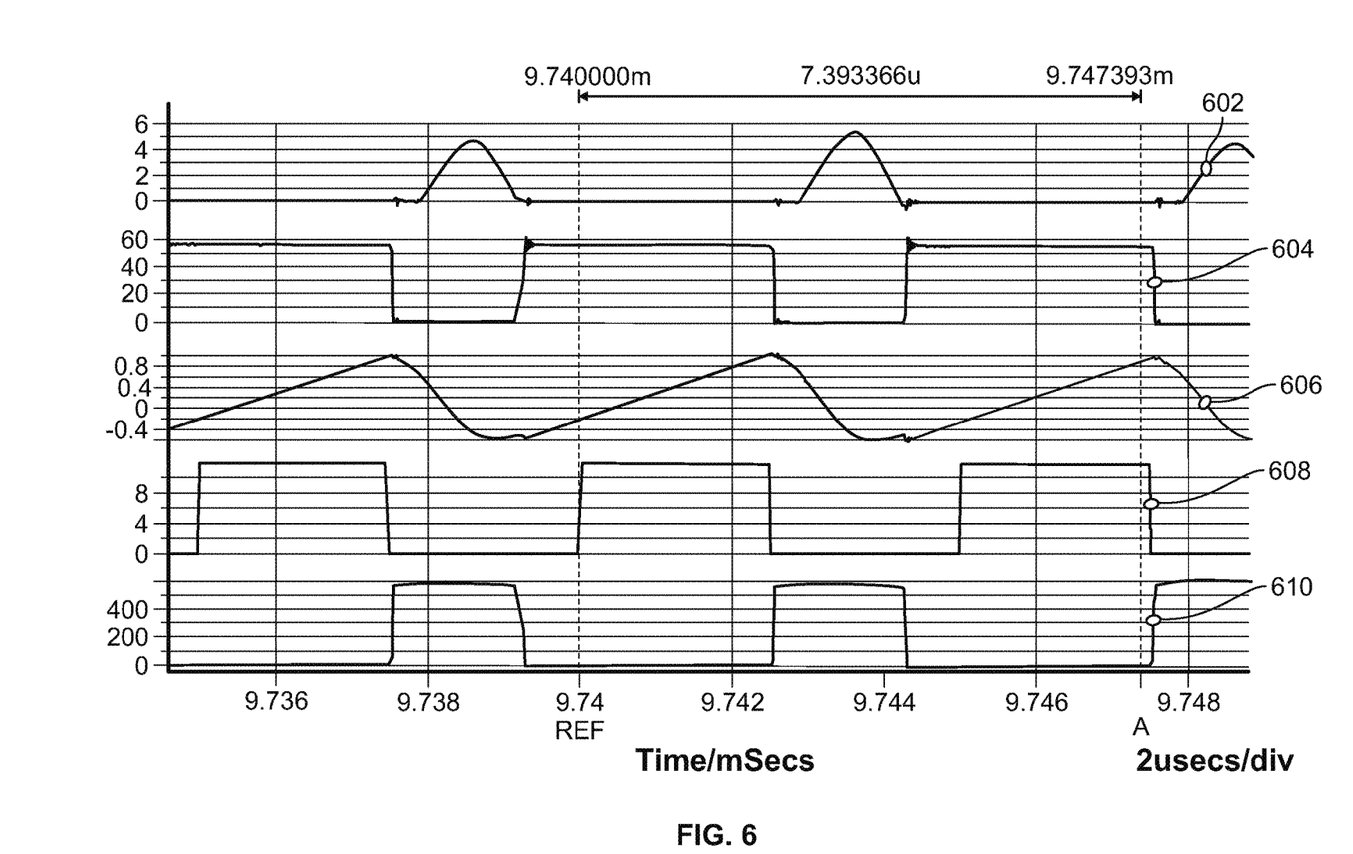
FIG. 6 is various voltage and current waveforms of the flyback power converter of FIG. 5.

FIG. 6 illustrates waveforms 602, 604, 606, 608, 610 of various parameters in the power supply 500 of FIG. 5. For example, the waveform 602 represents a current flowing through the MOSFET Q1, the waveform 604 represents a voltage Vds across the MOSFET Q1, the waveform 606 represents a current flowing through the inductor L1, the waveform 608 represents a voltage Vgs at the gate terminal of the MOSFET Q2, and the waveform 610 represents a voltage Vds across MOSFET Q2. The voltage Vds across each MOSFET indicates the state (e.g., ON/OFF) of that MOSFET.

By employing one or more features disclosed herein, a power supply may achieve desired no load requirements (e.g., less than 75 mW for a 45 W power supply), high voltage start-up, desired capacitor discharge functionality (e.g., x-capacitor discharge), etc. Additionally, soft switching of one or more of the switching devices disclosed herein may be achieved.

Additionally, the power supplies disclosed herein may be less expensive to manufacture than known power supplies including a control circuit that controls both a clamp switching device and a primary side power switch in response to signal(s) generated on the primary side of a transformer. For example, while the primary side clamp switching device(s) of the power supplies disclosed herein are controlled in response to signal(s) generated on the secondary side of a transformer (as explained herein), the primary side power switching device(s) (e.g., the switching device Q2 of FIGS. 3-5) can be controlled with a fixed frequency controller (e.g., a fixed frequency flyback controller, etc.), quasi-resonant (QR) controller (e.g., a QR flyback controller, etc.), etc. This control scheme costs less than a typical controller (e.g., a primary active clamp controller, etc.) that controls both a clamp switching device and a primary side power switch in response to primary side generated signal(s).

Figure 7:
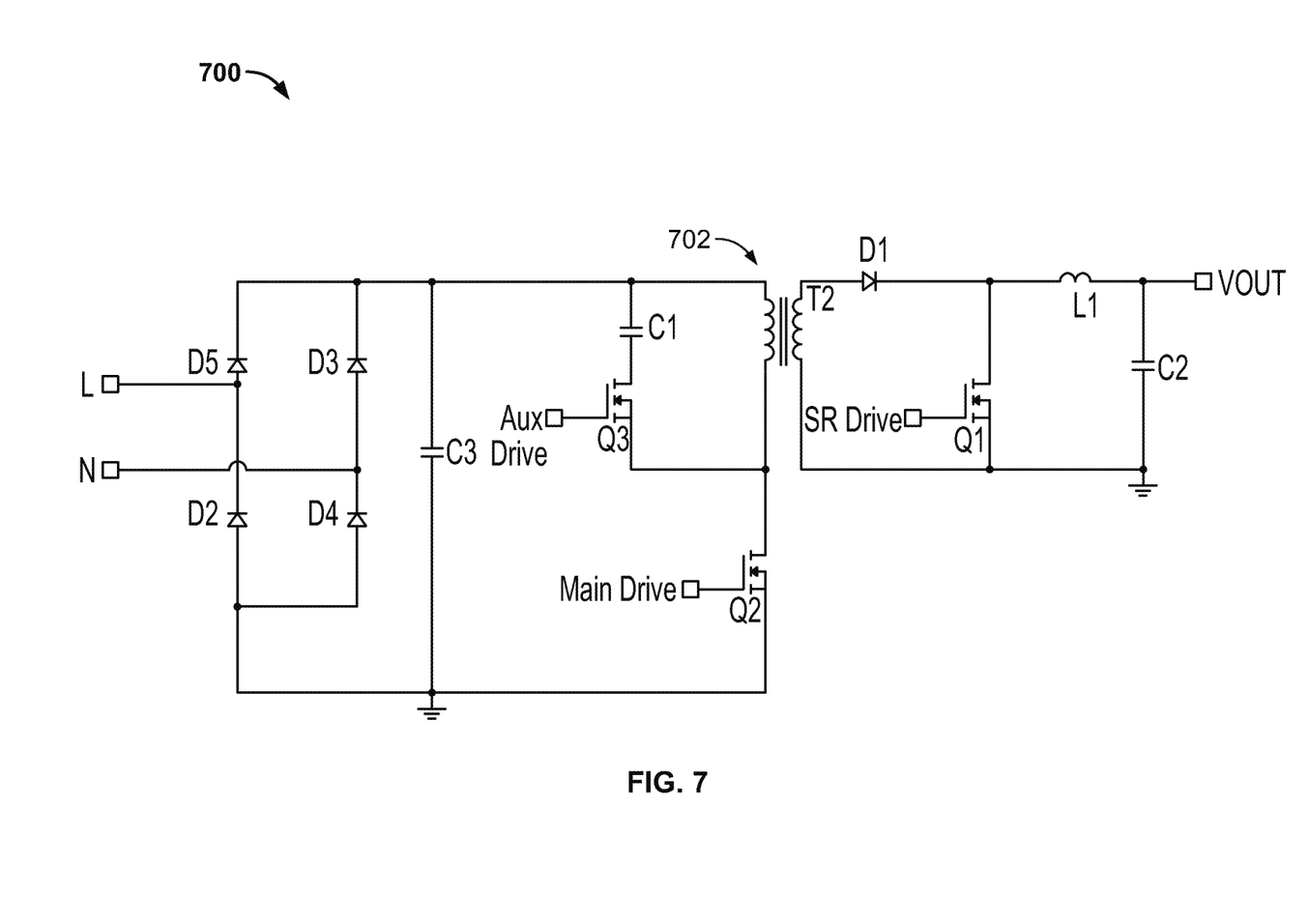
FIG. 7 is a circuit diagram of a power supply including a forward power converter having a clamp switching device on a primary side of a transformer that is controlled based on a signal generated on a secondary side of the transformer according to another example embodiment.

Further, the power supplies disclosed herein each may include only a power converter having isolation power circuitry, a power converter having isolation power circuitry and one or more other power converters having non-isolation power circuitry, etc. Each of the power converters may have any suitable topology. For example, the power converters may include a flyback power converter as shown in FIGS. 3-5. In other embodiments, the power converters may include a forward power converter. For example, FIG. 7 illustrates a power supply 700 including a forward power converter 702. Although not shown, the power supply 700 may include a control circuit that receives a signal from a secondary side of the transformer T2 via an isolation component, and controls the switching device Q3 on a primary side of the transformer T2 in response to that signal as explained herein.

Additionally, the power converters disclosed herein each may include at least one synchronous rectifier on the secondary side of its transformer. For example, in the particular examples of FIGS. 4, 5 and 7, the switching device Q1 coupled to the secondary side of the transformer is a synchronous rectifier.

Additionally, the power supplies each may be an AC-DC power supply, DC-DC power supply, or a DC-AC power supply. For example, the power supply 500 of FIG. 5 receives and outputs DC power and therefore may be considered a DC/DC power supply. Additionally, the power supplies 300, 400, 700 of FIGS. 3, 4 and 7 each include a rectifier (e.g., the full wave bridge rectifier 316) for converting AC power to DC power. Thus, the power supplies 300, 400, 700 of FIGS. 3, 4 and 7 may be considered AC-DC power supplies. Alternatively, other suitable rectifiers may be employed without departing from the scope of the disclosure.

Further, the power converters disclosed herein can operate in various different modes. For example, the power converters can operate in a discontinuous conduction mode (DCM). In such examples, energy stored in the transformer may be passed to its secondary winding(s) during a particular period (e.g., a flyback period if the power converter is a flyback converter). As such, current flowing through the transformer's primary winding(s) may fall to substantially zero before the primary side switching device (e.g., the switching device Q2 of FIGS. 3-5) turns on.

In other embodiments, the power converters can operate in a quasi-resonant (QR) mode. As such, the power converters may experience valley switching turn on. For example, a primary side switching device may be turned on when a voltage Vds across the switching device reaches its minimum value (e.g., substantially zero, etc.). In such cases, switching losses are typically reduced compared to other converters not operating in a QR mode.

Additionally, the power converters may include various filtering components. For example, the power converters of FIGS. 3, 4 and 7 each include an output capacitor C2 and an input capacitor C3 for filtering. Likewise, the flyback power converter of FIG. 5 includes the capacitor C2.

Further, although the clamping circuits disclosed herein each include one switching device, it should be apparent that more than one switching device can be employed without departing from the scope of the disclosure.

The switching devices disclosed herein may each include a transistor (e.g., a MOSFET as shown in FIGS. 3-5, etc.) and/or another suitable switching device. If MOSFET(s) are employed, the MOSFET(s) may include N-type MOSFET(s) and/or a P-type MOSFET(s).

The control circuits disclosed herein may include an analog control circuit, a digital control circuit (e.g., a digital signal controller (DSC), a digital signal processor (DSP), etc.), or a hybrid control circuit (e.g., a digital control unit and an analog circuit). For example, although the control circuits (including the driver circuits) of FIGS. 3-5 employ analog control circuitry, it should be apparent to those skilled in the art that one or more portions of the control circuits may be a digital control circuit disposed on an integrated circuit (IC). Additionally, the entire control circuit, some of the control circuit, or none of the control circuit may be an integrated circuit (IC).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switch mode power supply comprising:
an input to receive an input voltage;
an output to provide an output voltage;
a power converter coupled between the input and the output, the power converter including a transformer having a primary side and a secondary side, and a clamping circuit, the transformer isolating the input from the output, the clamping circuit having at least one first switching device coupled between the transformer and the input;
a second switching device coupled between the transformer and the output; and
a control circuit coupled to the first switching device of the clamping circuit and the second switching device, the control circuit including at least one isolation component and a switch driver, the control circuit configured to control the second switching device with a signal from the switch driver, pass the signal from the switch driver to the primary side of the transformer via the at least one isolation component, and control the first switching device coupled between the transformer and the input in response to the signal received from the switch driver via the at least one isolation component.

2. The power supply of claim 1 wherein the second switching device comprises a synchronous rectifier.

3. The power supply of claim 2 wherein the control circuit is configured to delay a transition of the at least one switching device coupled to the primary side of the transformer relative to a transition of the switching device coupled to the secondary side of the transformer.

4. The power supply of claim 3 wherein the power converter is configured to operate in a discontinuous conduction mode (DCM).

5. The power supply of claim 3 wherein the power converter is configured to operate in a quasi-resonant (QR) mode.

6. The power supply of claim 1 wherein the control circuit is configured to control the second switching device coupled between the transformer and the output such that the second switching device and the first switching device transition between an ON state and an OFF state in a corresponding manner.

7. The power supply of claim 6 wherein the control circuit is configured to delay a transition of the first switching device relative to a transition of the second switching device.

8. The power supply of claim 7 wherein the power converter is configured to operate in a discontinuous conduction mode (DCM).

9. The power supply of claim 7 wherein the power converter is configured to operate in a quasi-resonant (QR) mode.

10. The power supply of claim 1 wherein the control circuit is configured to delay a transition of the first switching device relative to a transition of the second switching device.

11. The power supply of claim 1 wherein the at least one isolation component includes a transformer.

12. The power supply of claim 1 wherein the power converter includes a flyback converter.

13. The power supply of claim 12 wherein the at least one isolation component includes a transformer.

14. The power supply of claim 12 wherein the control circuit is configured to delay a transition of the first switching device relative to a transition of the second switching device.

15. The power supply of claim 14 wherein the power converter is configured to operate in a discontinuous conduction mode (DCM).

16. The power supply of claim 14 wherein the power converter is configured to operate in a quasi-resonant (QR) mode.

17. The power supply of claim 1 wherein the power converter is configured to operate in a discontinuous conduction mode (DCM).

18. The power supply of claim 1 wherein the power converter is configured to operate in a quasi-resonant (QR) mode.

* * * * *